May 10, 1938. J. G. HAWLEY 2,116,515
BRAKE
Filed Nov. 20, 1933 7 Sheets-Sheet 1
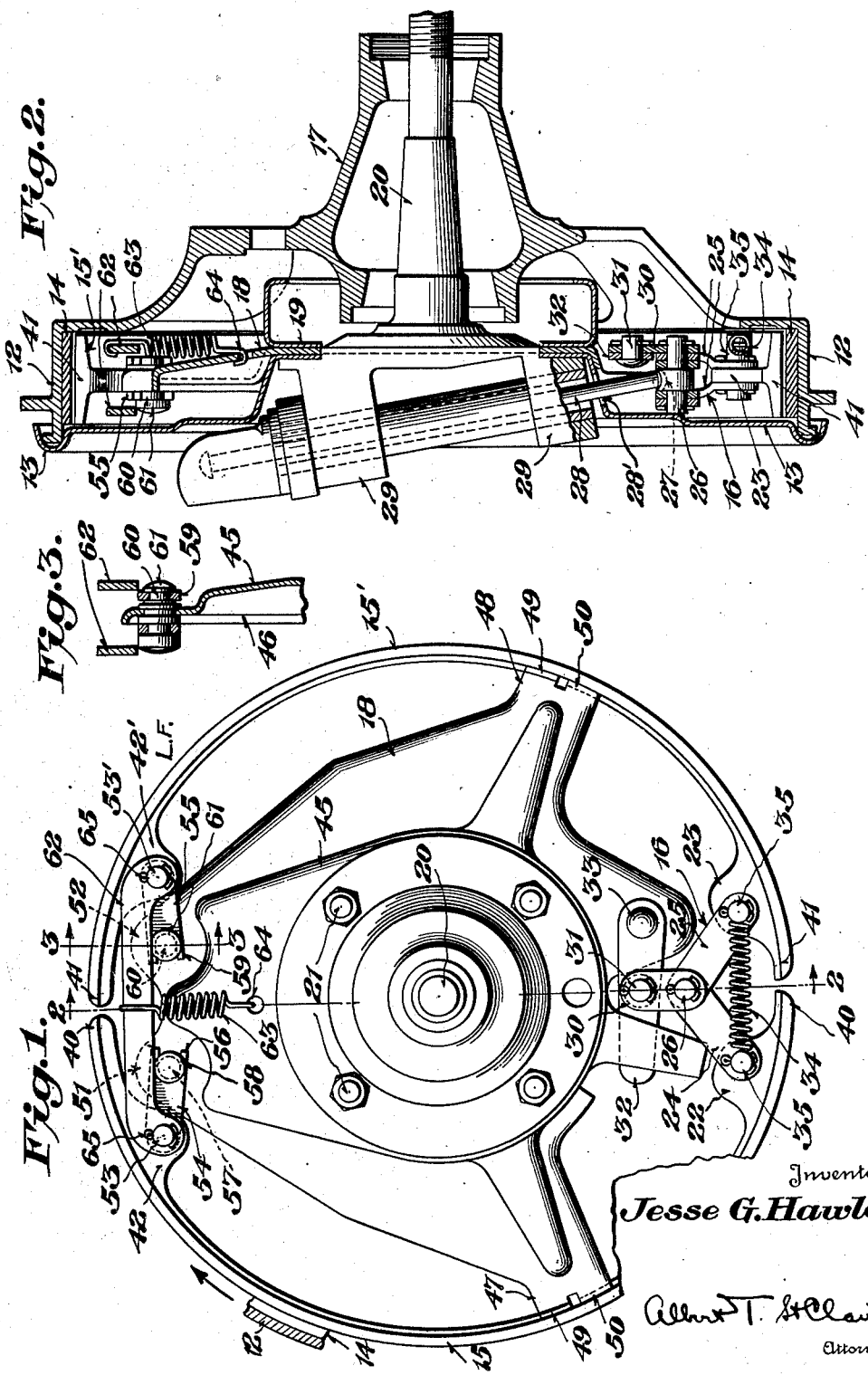
Inventor
Jesse G. Hawley,
Albert T. St Clair
Attorney

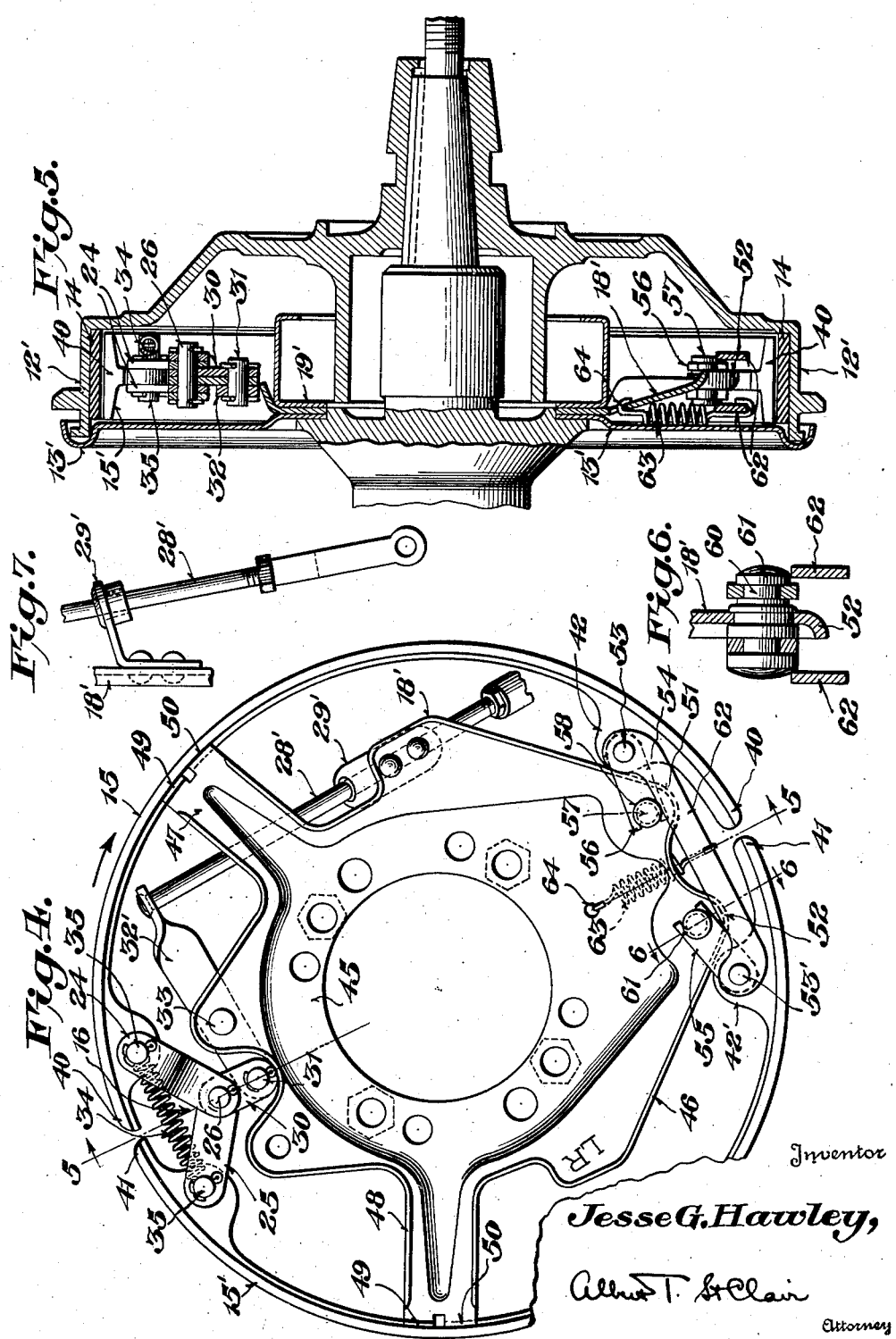

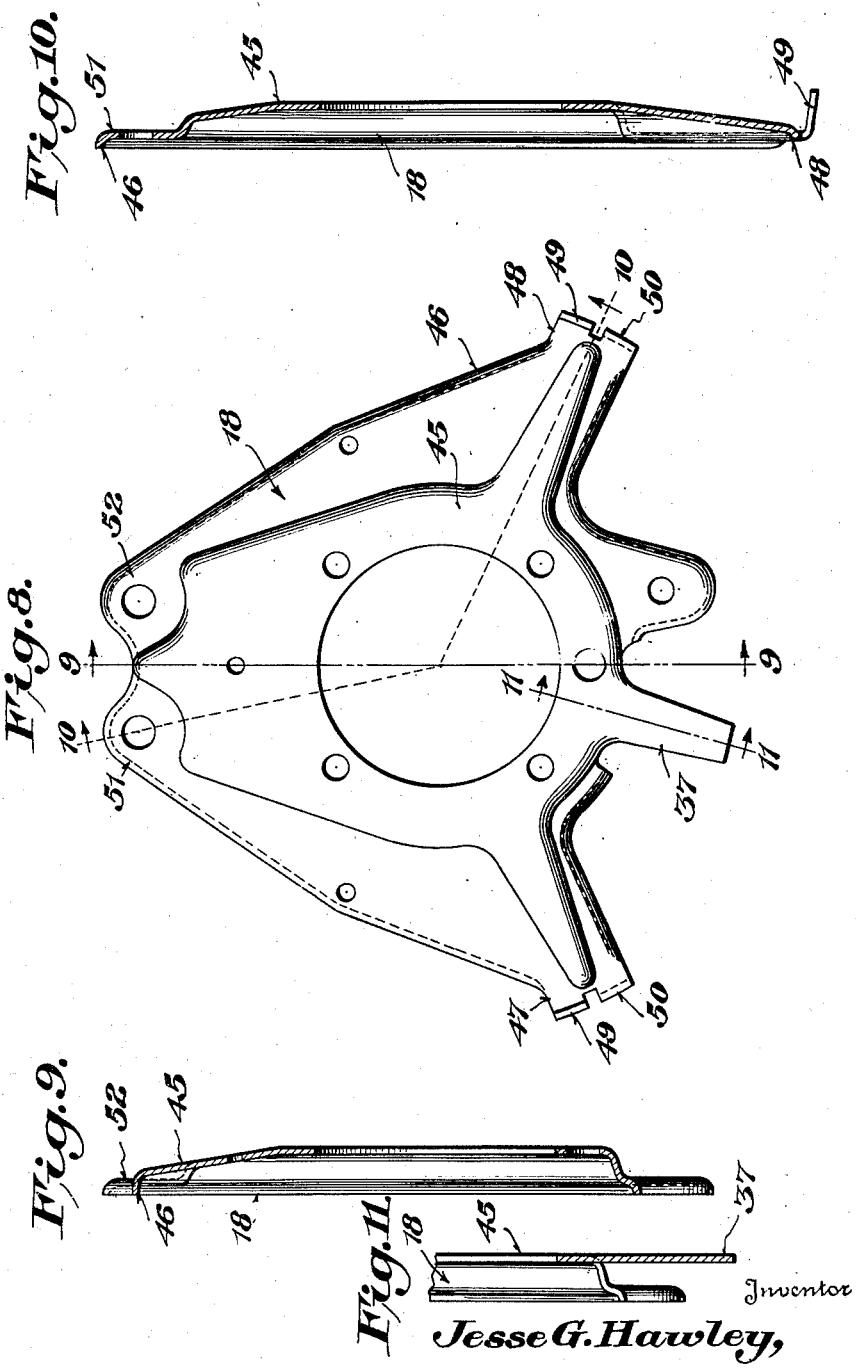

May 10, 1938.  J. G. HAWLEY  2,116,515
BRAKE
Filed Nov. 20, 1933   7 Sheets-Sheet 4
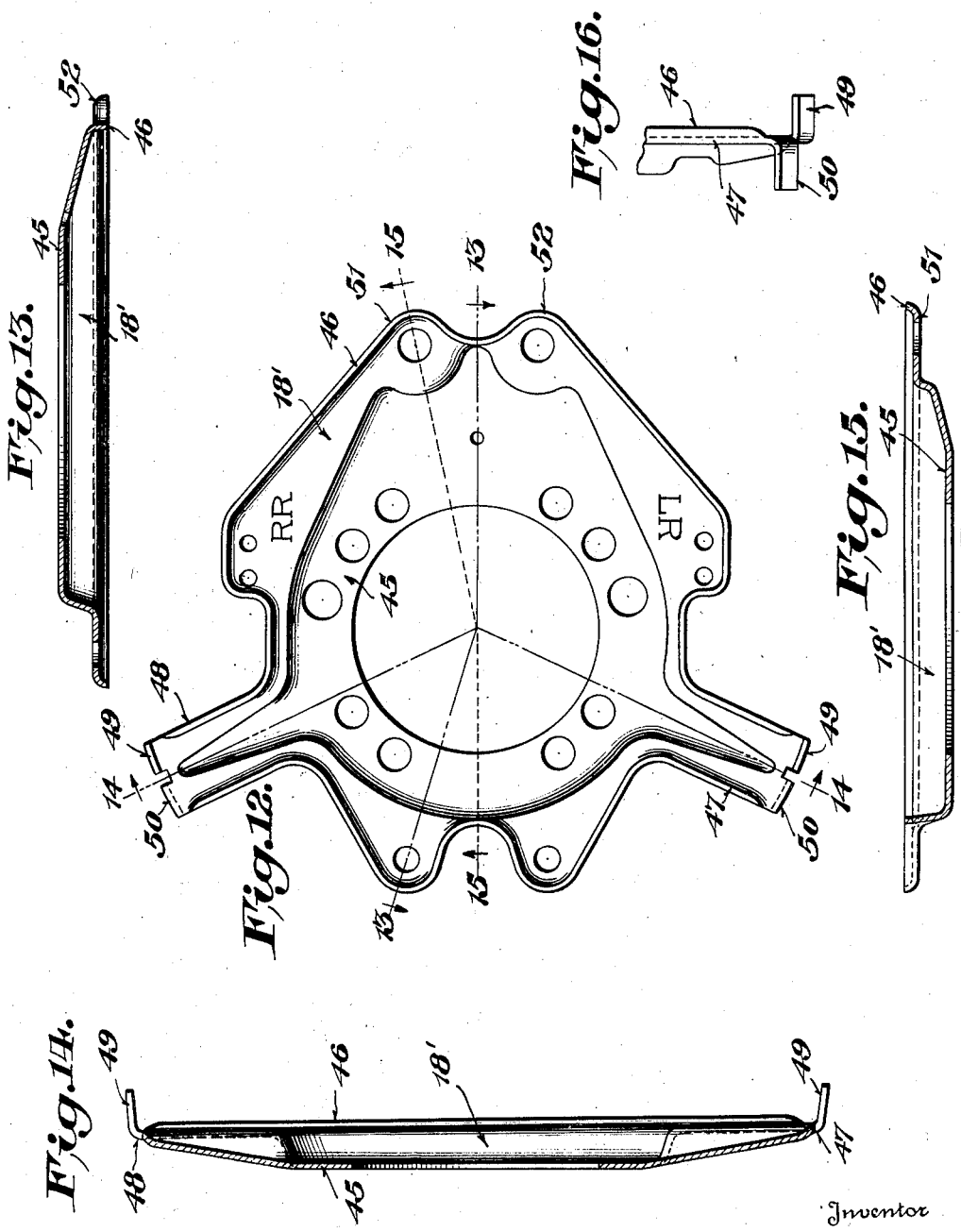
Inventor
Jesse G. Hawley,
By Albert T. St Clair
Attorney May 10, 1938.  J. G. HAWLEY  2,116,515
BRAKE
Filed Nov. 20, 1933  7 Sheets-Sheet 5
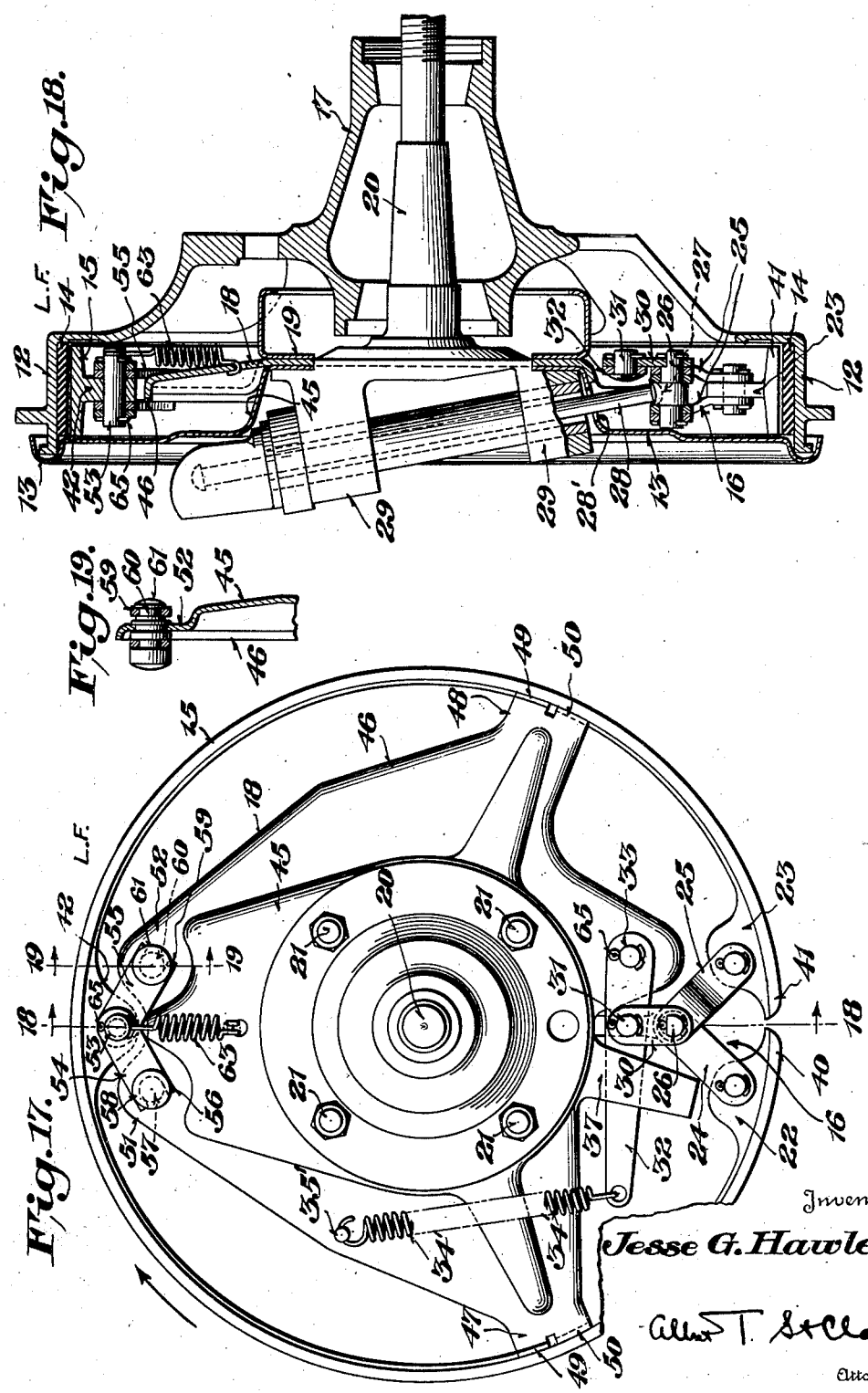
Inventor
Jesse G. Hawley,
Albert T. St Clair
Attorney

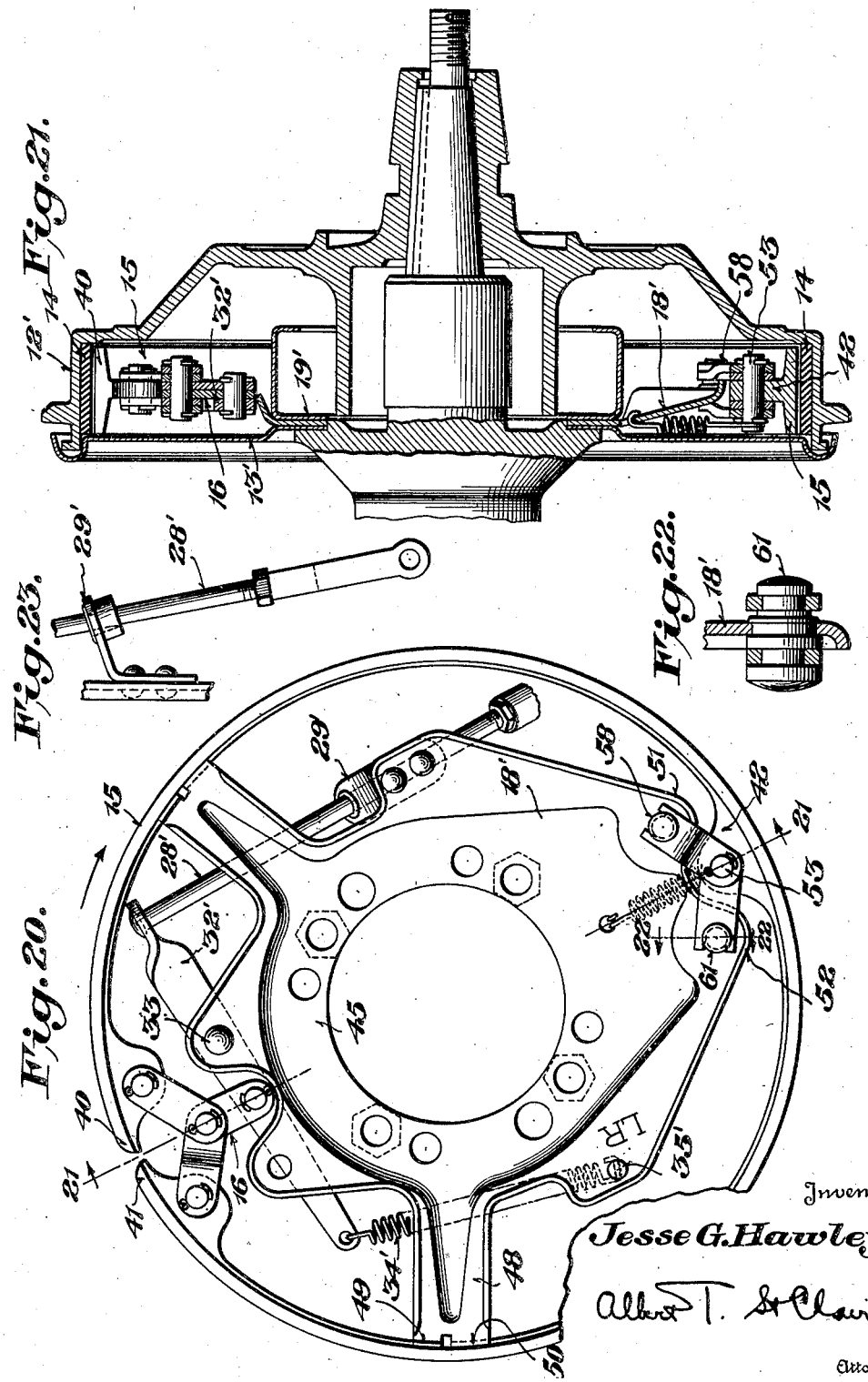

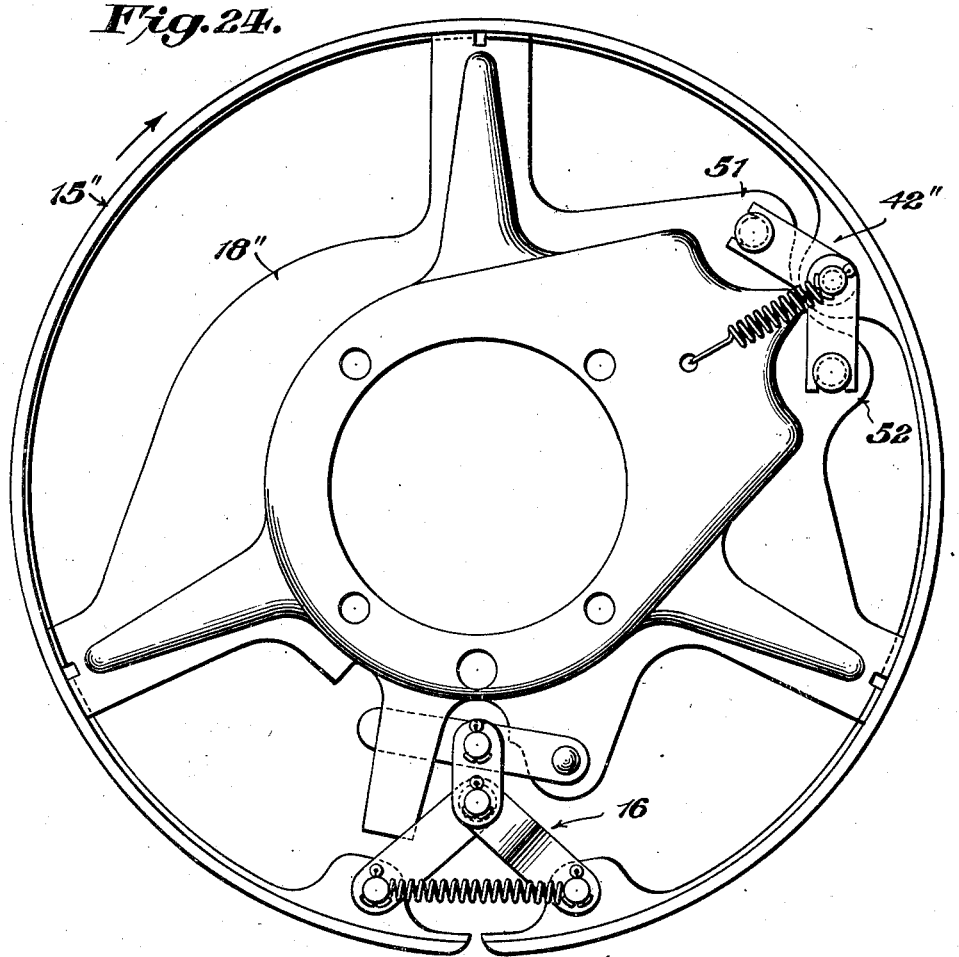
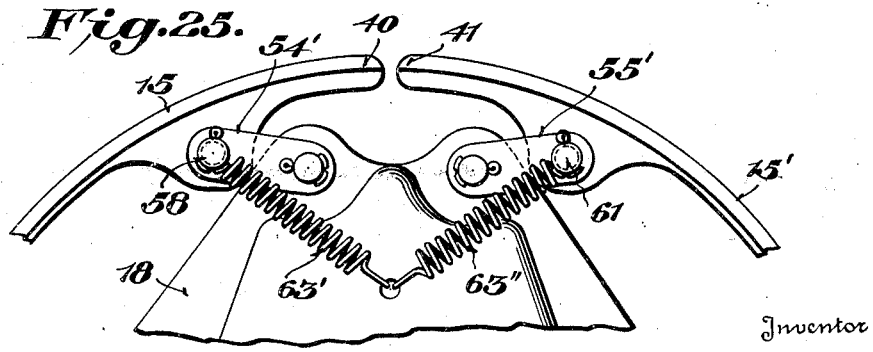

Patented May 10, 1938

2,116,515

UNITED STATES PATENT OFFICE 2,116,515

BRAKE

Jesse G. Hawley, Painted Post, N. Y., assignor to Hawley-Jones Corporation, Riverside, N. Y., a corporation of New York Application November 20, 1933, Serial No. 698,782

20 Claims. (Cl. 188—78)

This invention relates to the art of brakes, and more particularly to internally expanding brakes.

Prior brakes have generally been characterized by relatively complicated mechanism, including a fixed brake lining and a relatively fixed brake shoe, which resulted in overheating, improper centering of the brake sections, irregular wear on the brake lining, slow release, and difficult replacement of the brake lining.

My present invention, which is an improvement on the brake set forth and claimed in my application Serial No. 590,481, filed February 2, 1932, overcomes the above defects by providing a brake with a creeping brake lining and a full floating brake shoe provided with a floating connection therebetween. In the preferred form of my invention, the brake shoe is made in two parts, although it may be made of a single member.

It is therefore an object of this invention to provide a new and improved brake.

It is another object to provide a brake with a full floating brake shoe and a creeping brake lining.

It is a further object to provide a brake in which a full floating expanding brake shoe has a floating connection with a supporting member.

It is also an object to provide a brake in which a full floating brake shoe is made in two parts.

With the above and other objects in view, which will be apparent as the description proceeds, I have set forth my invention in the following specification and have illustrated it in the accompanying drawings, in which:

Figure 1 is a side elevation of the preferred form of brake shoe and its related parts.

Fig. 2 is a vertical transverse section, on the line 2—2 of Fig. 1, showing the brake shoe and related parts arranged in position in the brake drum for a front wheel of a vehicle.

Fig. 3 is a vertical sectional detail on the line 3—3 of Fig. 1, illustrating a pivot pin.

Figs. 4 and 5 are elevational and sectional views corresponding to Figs. 1 and 2, respectively, but showing the brake and related parts for the right rear wheel of a vehicle.

Fig. 6 is a vertical sectional detail on the line 6—6 of Fig. 4, illustrating a pivot pin.

Fig. 7 is a side view of a pull rod and its supporting bracket.

Figs. 8–16 are details of the spiders, Fig. 8 being a top plan view of a front spider, Figs. 9–11 being sections therethru on the lines 9—9, 10—10, and 11—11, respectively, of Fig. 8, Fig. 12 being a bottom plan view of one of the rear spiders, Figs. 13–15 being sections therethru on the lines 13—13, 14—14, and 15—15, respectively, of Fig. 12, and Fig. 16 being a perspective detail showing one form of the spacing flanges on the arms of a spider.

Fig. 17 is a side elevation of a modified form of brake shoe, and its related parts.

Fig. 18 is a vertical transverse section on the line 18—18 of Fig. 17 showing the modified form of brake shoe and related parts arranged in position in the brake drum for a front wheel of a vehicle.

Fig. 19 is a vertical sectional detail on the line 19—19 of Fig. 17 illustrating a pivot pin.

Figs. 20 and 21 are elevational and sectional views corresponding to Figs. 17 and 18, respectively, but showing the brake and related parts for the right rear wheel of a vehicle.

Fig. 22 is a vertical sectional detail on the line 22—22 of Fig. 20 illustrating a pivot pin.

Fig. 23 is a side view of a pull rod and its supporting bracket.

Fig. 24 is a side elevation of a further modified form of brake shoe for securing greater braking action; and Fig. 25 is a partial side elevation of a modified form of anchor support.

Referring to the accompanying drawings, and particularly to Figs. 1 and 2, my brake preferably comprises a drum 12, a fixed brake cover 13, a creeping brake lining 14, a full floating two part brake shoe 15, 15', and a toggle 16 for expanding the brake shoe into contact with the brake lining when the brake is to be applied, and for withdrawing it therefrom immediately upon releasing the brake.

In the embodiments of my invention shown herein, which are particularly adapted for use as a replacement brake for Ford automobiles, although they are not limited thereto, the drum 12 is preferably made integral with the hub 17 of a wheel (not shown), this being the drum of one of the front wheels in Fig. 2.

My brake shoe 15, 15' is mounted so as to have a full floating action by yieldingly connecting it with a spider 18, as described below, and the spider 18 and brake cover 13 are preferably bolted to the hub flange 19 of an axle 20 by a plurality of bolts 21.

The drum 12 and its wheel are free to turn with respect to the fixed brake cover 13, spider 18 and the floating brake shoe 15, 15'.

The toggle 16 preferably comprises two pairs of toggle links 24 and 25, whose outer ends are pivotally connected to bosses 22 and 23, respectively, formed integral with the ends of brake shoe 15, 15'. The inner ends of links 24 and 25 are mounted on a toggle pin 26, which is provided with a recess 27 to receive one end of a brake actuating rod 28, that is mounted in bearings 29 carried by the axle (not shown), rod 28 being adapted for actuation in the usual way by the brake rod connections (not shown). As indicated in Fig. 2, most of actuating rod 28 is out-side of the brake cover 13, the lower end of rod 28 passing thru an aperture 28' in the cover 13 in order to engage the recess 27.

Toggle 16 is pivotally connected to the spider 18 by a link 30, a pin 31 and a lever 32 that is pivoted to the spider at 33. A coil spring 34, attached to the toggle pins 35 for the toggle links 24 and 25, normally pulls the adjacent ends of the brake shoe members 15, 15' toward one another and maintains the toggle in inoperative position.

My floating brake shoe 15, 15' preferably comprises a pair of flexible bands 15, 15' with spaced rounded ends 40 and 41, the rounding serving to prevent gouging of the brake lining 14. I prefer to make the brake shoe of cast iron, although it can be made of spring steel or other flexible metals. I also prefer to make it of substantially flat cross section, although slightly thicker intermediate its width in order to give it added strength, but with a flat braking surface.

It is a particular point of my invention that the brake shoe is flexible throughout substantially its whole length and, to facilitate this, I prefer to make it of uniform cross section except for the bosses 22 and 23 near the toggle mechanism and similar bosses 42, 42' arranged near the opposite ends.

The spider 18 is preferably a steel stamping that is substantially triangular in shape and with a central strengthening boss 45 and strengthening down turned edges 46. The substantially triangular shape is secured by providing the spider with a pair of similar arms 47 and 48 having spacing flanges 49 and 50 for bearing against the inside of brake shoe 15, 15', and with a pair of lobes 51 and 52 arranged in close proximity to one another on the third arm of the spider.

Lobes 51 and 52 are adapted, in conjunction with the bosses 42, 42' of the brake shoe 15, 15' and their connection means, to form a floating connection for the brake shoe. For this purpose bosses 42, 42' are provided with pins 53, 53' that carry one end of each of two pairs of links 54 and 55, the opposite ends of links 54 being forked at 56 to slidingly engage a reduced portion 57 on a pin 58 carried by lobe 51, and the opposite ends of links 55 being similarly forked at 59 to slidingly engage a similar reduced portion 60 on a pin 61 carried by lobe 52. Bosses 42, 42' are held together near the adjacent portions of the spider 18 by a pair of tie-members 62, which are securely attached to the pins 53, 53' and pulled toward the spider by a spring 63, anchored to the spider at 64, until the tie-members stop against the pins 58 and 61. The pins 58 and 61 thus cooperate with the arms 47 and 48 to prevent contact between the shoe and the lining, except when the brake is applied, by maintaining the circular shape of the brake shoe and thus preventing it from having more than a predetermined sidewise movement.

The various pivot pins 26, 31, 33 and 53 are of any suitable type but may conveniently be perforated at one or both ends to receive cotter pins 65.

When it is desired to apply the brake, with the drum 12 turning in the direction of the arrow in Fig. 1, the operator actuates the brake rod connections, which in turn force the actuating rod 28 against the toggle pin 26, thus forcing toggle links 24 and 25 outwardly and causing the ends 40 and 41 of brake shoe 15, 15' to engage the brake lining and press it into contact with the drum. The pressure thus exerted against the brake shoe member 15 is increased by an energizing force on that shoe, causing it to be rocked up on anchor link 54 until its entire surface contacts lining 14 and forces the latter against drum 12 for the braking action. This causes the links 54 to engage pin 58 and pulls the links 55 away from pin 61 because there is no braking force acting against brake shoe member 15' to cause it to engage lining 14 near the boss 42'. Consequently this portion of shoe member 15' exerts no braking force.

Upon the release of the actuating rod 28, the spring 34 retracts links 24 and 25, and the ends 40 and 41 of the brake shoe, thus withdrawing brake shoe member 15 from contact with the brake lining 14, and allowing the brake drum to turn freely about the brake shoe.

When the drum 12 is turning in the opposite direction, at the time the brake is applied, the action is the same except that the braking action takes place between brake shoe member 15' and the lining and drum, and the links 54 pull away from the pin 58, without pulling the links 55 away from the pin 61.

The entire brake shoe 15, 15' being made of resilient material, and only being anchored by pushed contact against pins 58 or 61, has a tendency when released to disengage its entire surface from the brake lining because of the above characteristics and its free floating nature. In other words, when pressure upon the toggle is released, there is nothing to maintain engagement or braking action as the whole shoe simply contracts.

Furthermore, since the brake shoe is preferably a floating member and the brake lining is not secured to it, the characteristic clinging action of previous brakes is avoided and a quick positive release is secured. This eliminates the pronounced chattering of previous brakes when they are applied lightly, and the grabbing when they are applied quickly or savagely, and produces a smooth velvety braking action.

It is a special point of my invention to provide a full floating brake shoe 15, 15' which is secured only where it is pivoted to the toggle links 25, although it is prevented from having any substantial rotation by the pins 58 and 61. By being mounted in this manner the floating brake shoe will correct any slight off-center relation between the brake drum and the axle and prevent the characteristic ridging of the interior of the brake drum, which is the usual, if not universal, accompaniment of the use of a fixed brake shoe.

It is also a special feature of my invention to provide a brake with a creeping brake lining 14 which is free to creep or float in the space between the brake shoe 15, 15' and the drum 12 during the periods between applications of the brake and while the brake is being applied or released. By providing a creeping brake lining, I avoid the overheating and the tendency to secure braking with the same zone of the brake lining at all times which are inherent in a brake having a fixed brake lining.

It should be noted that the brake cover 13 cannot be made to fulfill the function of the spider 18, because the cover is inevitably disposed to one side of the central portion of the brake shoe, and this necessitates the use of an anchor pin to take the thrust of the braking action. The use of the spider 18 for this purpose prevents the necessity for taking this thrust on such a pin with the consequent loss of safety and security of action.

Turning now to Figs. 4-7, in which I have illustrated a corresponding construction for the rear brakes, it will be noted that the construction is in all substantial respects the same as that described previously, but there are certain minor differences as will now be pointed out.

In these figures, which are shown with reference to the left rear brake, the actuating rod 28' is attached directly to lever 32' and passes thru a bracket 29', carried by the spider 18'. Also, the spider 18' and brake cover 13' are bolted to the flange of the axle housing 19', instead of to the hub flange 19 of axle 20 as in Figure 1.

When it is desired to apply this brake with the brake drum turning in the direction indicated by the arrow in Fig. 4, actuating rod 28' is pulled by the brake rod connections (not shown), swinging lever 32' on its pivot 33 and forcing toggle 16 outwardly to cause the ends 40 and 41 of brake shoe 15, 15' to engage brake drum 12'. The braking force, due to the contact of the brake shoe member 15 with the brake lining 14, causes the former to engage the brake lining and force it into intimate contact with the brake drum 12', and shifts the floating connection to cause the links 54 to engage pin 58 and pulls the links 55 away from pin 61. When the brake is released spring 34 retracts toggle 16, and ends 40 and 41, and permits the brake drum to turn freely about the brake shoe. When the brake is applied with the wheels turning in the opposite direction, just the reverse movement occurs, and braking is secured with the brake shoe member 15'.

The creeping brake lining 14 is of any suitable type, such as the usual asbestos brake lining, but is preferably made by interweaving zinc wire therethru to serve as a convenient heat transmitting medium, in order that the heat generated between the shoe and the lining, in applying the brake, may be transmitted to and thru the drum, and dissipated into the atmosphere.

As indicated in Figs. 17-23, I have shown a modified form of my invention in which the brake shoe is a single member instead of a double member. The construction of this modified form is substantially the same as that heretofore described, but its operation is slightly different in that when the brake is applied, with the drum turning in the direction of the arrow in Fig. 17, the outward action of the toggle links 24 and 25 causes the ends 40 and 41 of the brake shoe to engage the lining and press it into contact with the drum, whereupon the energizing force on the portion of the shoe between the end 40 and the boss 42 increases the braking power. This causes the entire outer surface of the shoe to be progressively brought into contact with the brake lining and a much greater braking power is secured. It will be obvious that in this operation the links 54 will be pulled away from pin 58, while the links 55 continue to engage pin 61. Upon releasing the actuating rod 28, the spring 34', which in this modification may be attached to one end of lever 32 and to the spider 18 at 35', retracts the toggle 16, the links 24 and 25, and the ends 40 and 41 of the brake shoe. When the drum is turning in the opposite direction, when the brake is applied, the action is the same except that the energizing action takes place between the end 41 and the boss 42.

As indicated by Fig. 1, I have illustrated a retracting spring 34, and in Fig. 17 I have illustrated a retracting spring 34'. Obviously, however, I may use either of these types of springs, or in fact both of them in connection with either form of my invention. It should be noted that a spring such as spring 34', in addition to pulling the ends 40 and 41 of the brake shoe members toward one another as spring 34 does, also effects a radial withdrawal from contact with the brake lining.

From the above discussion it will be apparent that I have provided a new and improved brake which can be manufactured largely by stamping processes, and is simple in construction and efficient in operation. The brake drum 12 may be of pressed steel or cast iron. The toggle links, operating links and tie-members may be varied in construction and single members may be used instead of duplicate members.

It will also be apparent that, by means of my floating brake shoe 15, 15' I am able to correct the almost inevitable eccentricity of the mounting of the brake shoe with respect to the brake drum and to secure a quick release of the brake, and that, by virtue of the creeping brake lining, I not only eliminate the difficulty of originally installing as well as of replacing brake linings, but the wear resulting from the application of the brake is distributed over the entire area of the brake lining instead of being limited to certain portions thereof, and that this also accomplishes the highly valuable adjunct of eliminating overheating.

As a result of the use of the free floating connection between the brake shoe and the spider, I eliminate binding between the shoe and the drum, because the first braking action, as the shoe is expanded, shifts the pivot pin 53 or 53' in the direction the brake shoe 15 or 15' is forced and pulls the rear anchor link away from its pin. The floating connection also aids in taking care of wear on the brake lining, as well as any eccentricities in the mounting of the brake shoe with respect to the brake drum.

It is a further point of my invention that, as shown in Fig. 24, the point of connection is changeable by changing the shape of the spider and the lengths of shoe members 15 and 15' accordingly. In this figure the shoe is a single member 15" and the spider is designated 18". This permits bosses 42 or 42' to be placed at any desired position around the circumference of the brake in order to secure the desired braking action, and the further they are displaced, in the direction of the braking action, the greater will be the braking power secured. As shown herein the boss 42" has been displaced approximately one-third of the distance between the mid-point of the shoe and the right-hand end thereof.

As indicated in Figs. 1, 4, 17 and 20, however, for automobile brakes, I prefer to place it at the midway point for convenience in assembly and installation, and to secure adequate braking power when the car is backing.

As shown in Fig. 25, the connection between the shoe and the spider may comprise two pairs of closed links 54' and 55' instead of the open links 54 and 55 shown in the other figures. The links 54' and 55' are mounted in the same relation as in Fig. 1, but the single spring 63 of that figure is replaced by a pair of springs 63' and 63", which are connected to the spider at one end and to the pins 58 and 61 at their other ends. Springs 63' and 63" maintain bosses 42 and 42' in contact with the lobes of the spider and prevent sidewise movement of the brake shoe. This construction eliminates the tie-members 62 of Fig. 1.

Although I have herein disclosed a toggle operated brake, it will be apparent that the toggle mechanism can be replaced by hydraulic or cam operated mechanisms, and I, therefore, desire to claim broadly the features of a brake having a full floating connection between the brake shoe and the spider, and particularly in conjunction with a brake having a full floating brake shoe and/or a creeping brake lining, as well as the various features of construction specifically disclosed herein.

As many apparently widely different embodiments of this invention may be made without departing from the spirit thereof, it is to be understood that I do not limit myself to the foregoing embodiments or description except as indicated in the following claims.

I claim:

1. In a brake, the combination of a drum, a full floating brake shoe of substantially uniform cross section throughout its length for cooperation therewith, a creeping brake lining therebetween, means for applying said brake shoe, an anchorage for the brake shoe, supported intermediate the depth of the drum to equalize the torque on the anchorage and a floating connection between the anchorage and the brake shoe, said floating connection comprising pivot pins carried by the anchorage and open ended links carried by the brake shoe for abutment against said pivots.

2. The brake of claim 1, in which the brake shoe is a two part member.

3. The brake of claim 1, in which the brake shoe is a one part member.

4. In the brake of claim 1, means for withdrawing the brake shoe when the applying means is released.

5. In a brake, the combination of a fixed spider, a floating brake shoe surrounding same, a guide on the spider for the action of the brake shoe and a floating connection between the guide and the shoe, said spider being disposed approximately centrally of the transverse width of the brake shoe and being of lesser radius than the brake shoe.

6. In a brake, the combination of a brake cover, a fixed spider, a floating brake shoe surrounding same, a guide on the spider for the action of the brake shoe, a floating link connection between the guide and the shoe, and means pivoted to the spider for expanding said shoe.

7. In a brake, the combination of a flexible brake shoe, a spider, and a floating connection between these members, said spider being disposed approximately centrally of the transverse width of the brake shoe and being of lesser radius than the brake shoe.

8. The brake of claim 7, in which the brake shoe is a two part member.

9. The brake of claim 7, in which the brake shoe is a one part member.

10. In a brake, the combination of a drum, a flexible two part brake shoe, a spider, and a floating connection between these members, said floating connection comprising pivots carried by the brake shoe, links carried by the pivots, and a pair of guides carried by the spider for sliding engagement by the links, said spider being wholly confined within the outline of the drum and being of lesser radius than the brake shoe.

11. In a brake, the combination of a drum, a flexible brake shoe, a spider, and a floating connection between these members, said floating connection comprising a pivot carried by the brake shoe, a pair of links carried by the pivot, and a pair of guides carried by the spider for sliding engagement by the links, said spider being wholly confined within the outline of the drum and being of lesser radius than the brake shoe.

12. A floating connection for a floating two part brake shoe, comprising pivots carried by the brake shoe, a pair of pivot pins carried by an adjacent spider, said spider being disposed approximately centrally of the transverse width of the brake shoe, and a pair of links carried by the pivots on the brake shoe, and adapted to slidingly engage the pins on the spider.

13. A floating connection for a floating brake shoe, comprising a pivot carried by the brake shoe at its midpoint, a pair of pivot pins carried by an adjacent spider, said spider being disposed approximately centrally of the transverse width of the brake shoe and a pair of links carried by the pivot on the brake shoe, and adapted to slidingly engage the pins on the spider.

14. A spider for cooperation with a floating brake shoe, comprising a substantially triangular plate, one corner of said plate being provided with a plurality of anchor guide pins for cooperation with an adjacent member, and the other two corners of said plate being provided with means for positioning said plate with respect to said shoe.

15. A spider for use in a brake, comprising a central portion and three arms for spacing an adjacent member with respect to said spider, one of said arms having a pair of lobes arranged in proxmity to one another.

16. A spider for use in a brake, comprising a central portion provided with a strengthening boss, a short strengthening downturned flange on its edges, a pair of spacing arms for positioning the spider with respect to an adjacent member, and a pair of lobes arranged in proximity to one another and forming a third arm, the arms being spaced at substantially equal intervals.

17. In a brake, the combination of a fixed spider, a two part floating brake shoe surrounding same, and a floating connection for said shoe guided by the spider, said floating connection comprising means for holding one brake shoe part in contact with the spider merely by pushed contact and a tie-member connecting the adjacent ends of the brake shoe.

18. In a brake, the combination of a flexible two part brake shoe, a spider, and a floating connection between these members, said floating connection comprising pivots carried by the brake shoe, a pair of links carried by the pivots, a pair of guides carried by the spider for sliding engagement by the links, and a tie-member connecting the adjacent ends of the brake shoe.

19. In a brake, the combination of a drum, a full floating brake shoe for cooperation therewith, a creeping brake lining therebetween, a spider wholly confined within the outline of the drum, a floating connection between the spider and the brake shoe, and means for applying the brake shoe, said spider furnishing pivotal points for the applying means and the floating connection and taking the thrust of the braking action.

20. In a brake, the combination of a flexible two part brake shoe, a spider wholly confined within the outline of the brake shoe, and a floating connection between these members, said floating connection comprising pivots carried by the brake shoe, a pair of links carried by the pivots and a pair of guides carried by the spider for sliding engagement by the links.

JESSE G. HAWLEY.